ized Patent Office 2,843,632
Patented July 15, 1958

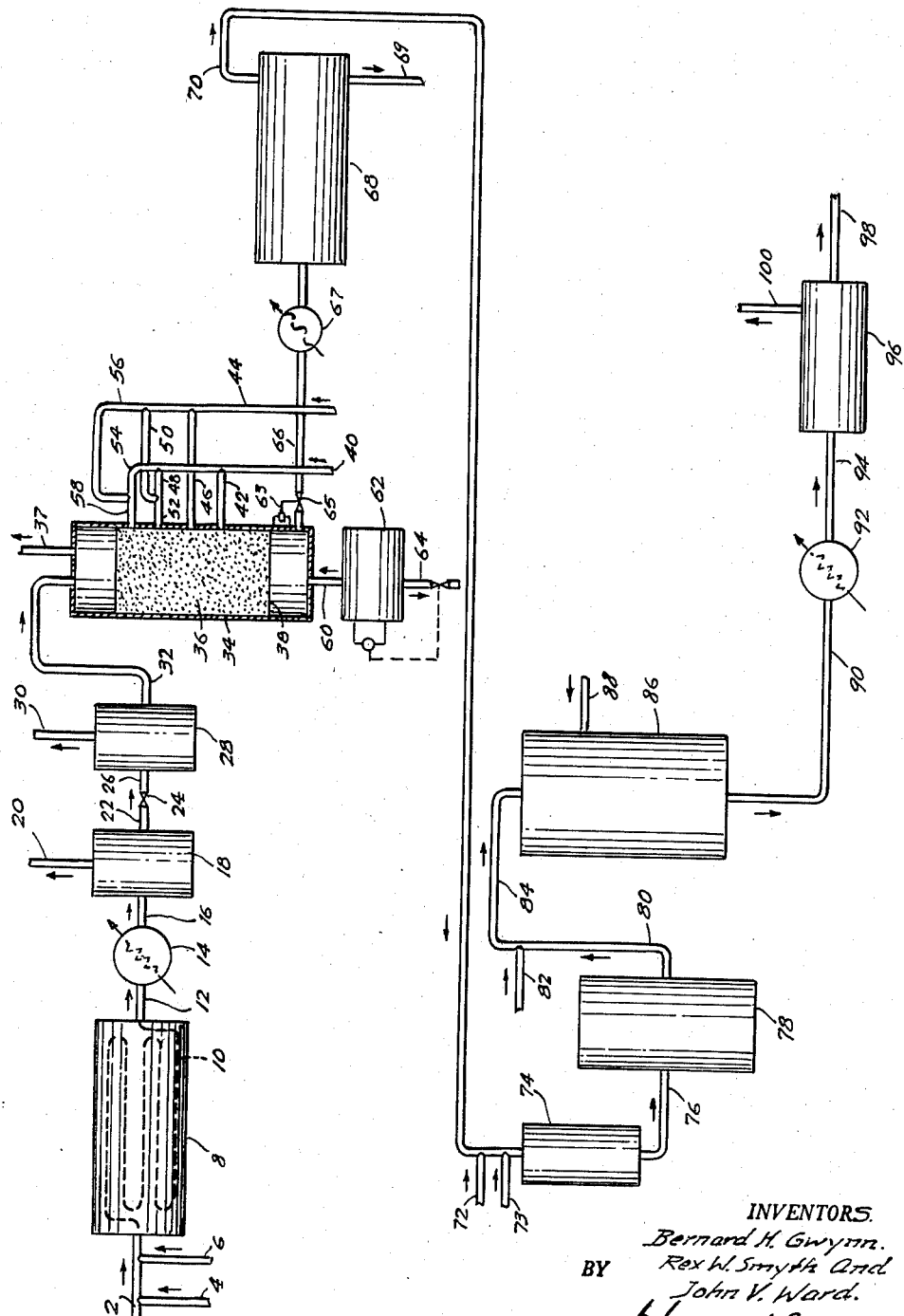

2,843,632
OXO PROCESS

Bernard H. Gwynn and Rex W. Smyth, Fawn Township, Allegheny County, and John V. Ward, Plum Township, Allegheny County, Pa., assignors to Gulf Research & Development Company, Pittsburgh, Pa., a corporation of Delaware Application September 7, 1956, Serial No. 608,448

6 Claims. (Cl. 260—604)

This invention relates to a process for the production of aldehydes and/or alcohols by the reaction between synthesis gas comprising hydrogen and carbon monoxide and an olefin or olefins to produce a hydroformylation reaction product containing aldehydes, which aldehydes can then be hydrogenated to the corresponding alcohols. This invention relates more particularly to a process for the production of aldehydes and/or alcohols wherein corrosion of metal equipment in contact therewith is substantially inhibited.

The process for the manufacture of alcohols from an olefin or olefins and a synthesis gas comprising hydrogen and carbon monoxide is generally known as the Oxo process. In the first stage of the process, sometimes referred to as the hydroformylation stage, an organic compound containing olefinic linkages is reacted with a synthesis gas comprising hydrogen and carbon monoxide at an elevated temperature and an elevated pressure in the presence of a catalyst containing metals of the iron group, such as nickel, cobalt or iron, to produce a hydroformylation reaction product comprising predominantly aldehydes containing one more carbon atom than the reacted olefins, as well as some alcohols, acids, aldols, acetals, unreacted constituents, namely hydrogen, carbon monoxide and olefins, and the hydroformylation catalyst in the form of a dissolved metal carbonyl. The hydroformylation reaction product is subsequently treated in a second stage to decompose and remove the catalytic metal, after which the demetalled hydroformylation reaction product is passed to the hydrogenation stage where the aldehydes are hydrogenated in the presence of a hydrogenation catalyst to obtain a product consisting predominantly of the corresponding alcohols. The alcohol is removed from the latter product by any conventional means, preferably by distillation.

As noted, the hydroformylation reaction product comprises predominantly aldehydes, some alcohols, acids, aldols, acetals, unreacted constituents, namely hydrogen, carbon monoxide and olefins, and the hydroformylation catalyst in the form of a dissolved metal carbonyl. In addition, relatively small amounts of other metallic carbonyls, particularly iron carbonyl, are also present. These metal carbonyls are generally formed from the reaction of carbon monoxide employed with the walls of the reactor, transfer lines, or impurities in the feed.

The hydroformylation reaction product from the first stage of the process is passed to a demetalling zone wherein the metal carbonyls present are decomposed and removed from the hydroformylation reaction product. This can be done effectively by contacting the hydroformylation reaction product carrying the metal carbonyls with steam, preferably in the presence of an inert gas such as hydrogen, nitrogen, etc. The steam in condensing supplies heat to the hydroformylation reaction product and decomposes the metal carbonyls to the corresponding metal and carbon monoxide. The water resulting from the condensation of steam is removed from the system and the substantially completely demetalled hydroformylation reaction product can thereafter be subjected to hydrogenation conditions to convert the aldehydes to the corresponding alcohols.

While the process defined above produces aldehydes and alcohols of great commercial interest, nevertheless the metal parts in contact with the water resulting from the condensation of steam, that is, in the demetalling zone and the water removal lines, are severely damaged as a result of corrosion. We have found that the corrosion of metal parts in contact with the water resulting from the condensation of steam can be substantially reduced and an excellent product can still be obtained by conducting the demetalling process in the presence of a substantial amount of calcium carbonate. We have found, too, that when the hydroformylation reaction product is treated in accordance with our invention and subsequently hydrogenated, the activity of the hydrogenation catalyst is increased. Unexpectedly, substantially all of the calcium carbonate used in the demetalling tower remains therein and only a small portion thereof is removed therefrom. Of the portion removed, substantially all is removed along with the water and not with the demetalled hydroformylation reaction product.

In order that the invention may be understood more fully, reference should be had to the accompanying drawing, the single figure of which is a diagrammatic flow sheet showing a typical method of carrying out a preferred embodiment of our invention for the production of alcohols using as raw materials synthesis gas and olefins. In the drawing the showing of some flow devices has been omitted in the interest of clarity. The drawing is hereby incorporated in and made part of this specification.

Synthesis gas containing hydrogen and carbon monoxide in a molar ratio of about one to one at an elevated pressure of about 1500 to about 5000 pounds per square inch, preferably about 3500 pounds per square inch, is introduced through line 2, where it is joined by an olefin or olefins in line 4 and the hydroformylation reaction catalyst in line 6. The mixture is then passed to hydroformylation reaction zone 8, which is preferably in the form of an elongated coil reactor 10. In order to remove the exothermic heat of the hydroformylation reaction, and maintain the desired temperature of reaction, the coil 10 is preferably immersed in a bath of cooling water. The olefin may be any suitable straight or branched chain olefin or olefins having from 3 to 18 carbon atoms, such as propylene or heptene, or olefin polymers such as tripropylene and tetrapropylene, and the catalyst is preferably a cobalt salt of any suitable organic acid such as a fatty acid, preferably one containing at least 6 carbon atoms, or a naphthenic acid. Preferred salts are cobalt 2-ethylhexanoate and cobalt naphthenate. In general the catalyst should be introduced in an amount corresponding to about one atomic proportion of cobalt for each 600 mols of olefins, while about one mol of olefin should be used for each mol of hydrogen and carbon monoxide. Coil reactor 10 is preferably operated at a pressure of about 1500 to about 5000 pounds per square inch and a temperature of about 260° to about 460° F., depending upon the feed rate and other reaction conditions.

A liquid hydroformylation reaction product comprising predominantly aldehydes containing one more carbon atom than the reacted olefins contained, some alcohols, aldols, acetals, unreacted constituents, namely hydrogen, carbon monoxide and olefins, the hydroformylation catalyst in the form of a dissolved metal carbonyl, such as cobalt carbonyl, iron carbonyl, 2-ethylhexanoic acid or naphthenic acid, and formic acid, is removed from coil reactor 10 and transferred by line 12 to cooler 14, where the hydroformylation reaction product is cooled to a suitably low temperature, such as about 110° F., and then passed through line 16 to high pressure separator 18. In high pressure separator 18, a gas phase comprising synthesis gas and traces of vapors of metal carbonyls and organic compounds is separated from a liquid phase comprising the remainder of the hydroformylation reaction product. The gas phase is removed through a pressure regulating valve in line 20 and vented from the system. If desired, the gas phase removed by line 20 can be recycled to the hydroformylation stage.

The liquid hydroformylation reaction product at a pressure of about 1500 to about 5000 pounds per square inch, preferably about 3500 pounds per square inch, and a temperature of about 100° F. is then passed by line 22 through valve 24 and line 26 to the low pressure separator 28 which can be at about 300 pounds per square inch. In separator 28 a gas phase containing unreacted gas and traces of vapors of metal carbonyls and organic compounds at the low pressure are separated from a liquid phase comprising the remainder of the hydroformylation reaction product including small amounts of carbon monoxide and hydrogen which are dissolved in the hydroformylation reaction product under the conditions of separation. The gas phase is removed by line 30 and can also be recycled to the hydroformylation reaction zone if desired.

The liquid hydroformylation reaction product is removed from the low pressure separator 28 and passed by line 32 downwardly into demetalling tower 34, which can be operated at a pressure of about 125 to about 350 pounds per square inch, preferably about 210 pounds per square inch. An additional demetalling tower which can be used concurrently with or alternately with demetalling tower 34 can also be employed if desired. The tower 34 is substantially filled with calcium carbonate 36 which is held in place by a grid 38 mounted adjacent the bottom thereof. Saturated steam, for example, at a pressure of about 450 pounds per square inch gauge and a temperature of about 460° F. is introduced by lines 40 and 42 to a point near the bottom of demetalling tower 34 above grid 38. A gas such as hydrogen is introduced by lines 44 and 46 to demetalling tower 34 at a point above the point where the steam is initially introduced. Additional steam is introduced by lines 40 and 48 and additional hydrogen by lines 44 and 50. The resulting mixture is introduced by line 52 into demetalling tower 34 above the point where the gas is initially introduced by means of line 46. In like manner, steam is passed by lines 40 and 54 and hydrogen by lines 44 and 56. The resulting mixture is introduced by line 58 into demetalling tower 34 at a point above the point where the mixture of steam and hydrogen is introduced by line 52.

In the demetalling tower the liquid hydroformylation reaction product is heated from an initial temperature of about 100° F. at which it enters the demetalling tower to a final temperature of about 340° to about 420° F. A temperature gradient is thus established along the vertical length of the demetalling tower 34, with the temperature adjacent the bottom being about 340° to about 420° F. and the temperature adjacent the top being about 100° F. Below the top of the demetalling tower but in the upper portion thereof, the hydroformylation reaction product is heated to a temperature of about 165° to about 212° F., which is sufficiently high to decompose and deposit substantially completely the cobalt carbonyl on the calcium carbonate in the upper part of the demetalling tower, while in the lower portion above grid 38 the hydroformylation reaction product is heated to a temperature of about 340° to about 420° F., and iron and other alloying metal carbonyls are decomposed with the consequent decomposition and deposition of the free metals upon the calcium carbonate in the lower portion of the demetalling tower. The decomposition of the corresponding carbonyls on the cobalt carbonate is thus substantially complete. The coated calcium carbonate can be removed periodically from the demetalling tower and replaced if desired. Carbon monoxide resulting from the decomposition of the metal carbonyls and hydrogen are removed overhead by line 37.

The size of the calcium carbonate particles is not critical, although they should be large enough to permit a reasonable rate of flow of liquid through the demetalling tower even when the metal resulting from decomposition deposits on the calcium carbonate. In general, calcium carbonate whose average longest dimension is about ¼ to about 2 inches, preferably about ½ to about one inch, is satisfactory. The space velocity of the hydroformylation reaction product through the demetalling zone is also not critical, although it should be, for best results, about 0.01 to about 1.0, preferably about 0.1 to about 0.3.

The hydroformylation reaction product, though substantially free of dissolved metals, such as cobalt and iron carbonyls, is admixed with water resulting from condensation of the steam introduced into demetalling tower 34. The water contains some dissolved metal carbonyls or other metal salts and most of the pulverized or finely divided calcium carbonate or other solid materials lost from the demetalling zone. Since these materials may be detrimental to the subsequent Oxo reactions, it is important that they be removed from admixture with the hydroformylation reaction mixture. This is done by removing the water carrying the impurities from the hydroformylation reaction product. The lower portion of the demetalling tower 34 below grid 38 serves as a liquid reservoir and a liquid level is held in this section by level controller 63 and regulator 65. The mixture of hydroformylation reaction product and water separates into two layers, with the water forming the lower layer. The water finds its way through line 60 into the bottom of separator 62 where it is withdrawn through line 64. The upper part of the mixture comprising essentially the remainder of the hydroformylation reaction product is found in the lower portion of demetalling tower 34, line 60 and the upper part of separator 62. The purpose of this design is to settle the water at the same pressure and temperature that exists in the bottom of the demetalling tower, thus minimizing emulsion troubles. The hydroformylation reaction product containing some water in solution and some free water is removed from the side of demetalling tower 34 by line 66 and passed through cooler 67. The product thus cooled to about 100° F., is then passed through an Excelso or similar type filter 68 where most of the free water remaining in the hydroformylation reaction product is continuously removed by line 69.

As noted, the water removed from the demetalling zone carries substantially all of the calcium carbonate lost from the demetalling zone. Thus, in a typical run, the calcium carbonate in the water stream is about 2000 to about 3000 parts per million, while the calcium carbonate in the aldehyde stream in line 70 amounts to only about 0.1 to about 1.0 part per million. In addition, the cobalt content of the demetalled hydroformylation reaction product which leaves filter 68 by way of line 70 is usually less than about 0.1 milligram per liter, while the iron content is usually less than about 0.4 milligram per liter.

The product in line 70 comprising aldehydes is subsequently passed to a hydrogenation zone wherein the aldehydes are converted to the corresponding alcohols. However, as noted, the hydroformylation reaction product in line 70 still carries some metal carbonyls. While the amounts are small, it would be desirable to remove them from the product prior to hydrogenation. In addition, under the reaction conditions employed in the hydrogenation reactor, some of the organic constituents in the hydroformylation reaction product tend to polymerize, condense and/or decompose to leave additional deposits on the catalyst surface, to still further reduce the activity thereof.

The difficulties noted above can be overcome and deposits on the catalyst in the hydrogenation reactor can be reduced by contacting the hydroformylation reaction product from the second or demetalling stage of the process, prior to its entry into the hydrogenation zone, with a metallic hydrogenation catalyst in the free metal or oxide form, in which the metal is selected from the metals of group VIII of the periodic table, especially a nickel catalyst, at an elevated temperature and pressure and preferably in the presence of hydrogen and water whereby metal carbonyls not removed in the second stage of the process, sulfur or sulfur compounds which may have been introduced into the system along with the original olefin feed, and organic constituents which would tend to deposit upon the hydrogenation catalyst in the hydrogenation zone under conventional operation conditions, are removed from the hydroformylation reaction product obtained in the second stage. Since the catalyst present is a hydrogenation catalyst, an appreciable amount of hydrogenation of aldehydes to the corresponding alcohols will take place. The purpose of adding water along with hydrogen and hydroformylation product to reactor 78 is to prevent polymerization of aldehydes, which polymerization would otherwise occur concomitantly with hydrogenation.

Thus the substantially demetalled product in line 70 is joined with hydrogen from line 72 and water from line 73 and the mixture is passed through heat exchanger 74 wherein the mixture is heated to a temperature of about 290° to about 380° F., preferably about 300° to about 370° F. The mixture is removed from heat exchanger 74 and at this temperature is passed by line 76 to reactor 78, packed with a metallic hydrogenation catalyst in the free or oxide form, in which the metal is selected from the metals of group VIII of the periodic table, especially nickel.

The catalyst employed in reactor 78, in addition to removing the above-noted undesirable contaminants from the demetalled hydroformylation reaction product, also functions as a hydrogenation catalyst. Therefore, as noted above, depending on the activity of the catalyst as a result of contamination, poisoning, etc., a substantial amount of hydrogenation of the aldehydes in the demetalled hydroformylation reaction product occurs in the reactor 78. Since the reactor 78 is preferably operated under adiabatic conditions (i. e., the hydroformylation reaction product is flowed through the reactor in the absence of heat exchange means, and all heat produced, other than minor losses from the sides of the chamber, are removed in the product leaving the reactor), and the hydrogenation reactions occurring in reactor 78 are exothermic in nature and release heat, the products leaving the reactor are at a higher temperature than those entering the reactor 78. However, in order to efficiently remove contaminants such as sulfur, the remaining metal carbonyls and polymerization, condensation and/or decomposition products from the demetalled hydroformylation reaction product, prevent appreciable hydrocracking reactions from taking place and obtain maximum hydrogenation in reactor 78, the maximum reaction temperature in reactor 78 should be no higher than about 400° F., and preferably from about 380° to about 400° F. The temperature of the demetalled hydroformylation reaction product entering reactor 78 must be high enough to permit the desired reactions to take place therein but low enough so that the temperature rise of the products passing therethrough at the selected space velocity (volume of hydroformylation charge/volumes of catalyst/hour) will not raise the temperature to a value above about 400° F. and preferably will not raise the temperature to a value above about 380° F. The temperature of the incoming demetalled hydroformylation reaction product is preferably maintained at about 290° to about 380° F., preferably about 300° to about 370° F. as required, depending on the space velocity, to produce an exit temperature within the maximum temperature range given above.

The pressure in reactor 78 is preferably maintained at about 50 to about 5000 pounds per square inch, especially from about 250 to about 3500 pounds per square inch. A space velocity of about 3 to about 12, preferably from about 4 to about 8, based upon the demetalled hydroformylation reaction product, has been found to be satisfactory; the specific space velocity within these ranges maintained in a particular case will be selected to achieve the results referred to above.

The product leaving reactor 78, substantially free of sulfur, metal carbonyls, and organic constituents tending to polymerize, condense and/or decompose at the temperatures and pressures employed either in the reactor 78 or the hydrogenation reactor, is removed from reactor 78 through line 80 where it is joined by additional hydrogen from line 82. The resulting cooled mixture is flowed through line 84 to hydrogenation reactor 86 at a temperature of about 300° to about 380° F. If sufficient hydrogen is already present in the product leaving reactor 80 for the desired reactions in hydrogenation reactor 86, the product can be cooled to a temperature of about 300° to about 380° F. in any desired manner, for example by indirect heat exchange with a cooling medium. The hydrogenation reactor, like reactor 78, is operated under adiabatic conditions and is packed with a suitable hydrogenation catalyst, preferably a nickel catalyst, similar to that used in reactor 78, and is maintained at a pressure of about 50 to about 5000 pounds per square inch and a maximum temperature of about 380° to about 400° F. At these temperatures and pressures, efficient hydrogenation of aldehydes to alcohols is obtained. Additional hydrogen for hydrogenation in hydrogenation reactor 86 can be supplied by line 88.

The hydrogenation product from hydrogenation reactor 86 is removed therefrom by line 90 and passed through cooler 92 where the product is cooled to a suitable low temperature, such as about 110° F., and then flowed, by line 94, to separator 96. The desired alcohol product is removed from separator 96 by line 98 and unreacted hydrogen is removed by line 100.

In order to demonstrate the effectiveness of our process in reducing corrosion of metals in contact with water separated from a hydroformylation reaction product, we have made several runs, identical in all respects, except that in one Berl saddles, ½ inch in size, were used as packing in the demetalling zone, while in the other, calcium carbonate whose longest average dimension was about ½ inch was used as packing. Thus hydrogen and carbon monoxide, in a molar ratio of about 1:1, were passed together with one mole of heptene and 0.33 gram of cobalt salt of 2 ethylhexanoate at a total rate of about 62.6 mols of reactants per hour through a hydroformylation reaction zone at a temperature of 350° F. and a pressure of 3500 pounds per square inch. The hydroformylation reaction product, after cooling and reduction of pressure and removal of unreacted hydrogen and carbon monoxide, was passed to the demetalling zone at a pressure of about 270 pounds per square inch and a temperature of 110° F. As noted, in one case ½" Berl saddles were used as packing, while in the other calcium carbonate was used. The space velocity (volume of product per volume of packing per hour) was 0.13 and the temperature, varied from 365° to 390° F. in each instance, was obtained as shown in the drawing. An SAE 1020 plate measuring 3 x ¾ x 1/32 inches was placed at the interface between the demetalled hydroformylation reaction product and the water condensed from steam. The test was continued for 276 hours. The results are tabulated below in Table I.

Table I

| Run | Packing in Demetalling Tower | Corrosion Rate, Inches Penetration Per Year |
|---|---|---|
| A | Berl Saddles | 0.21 |
| B | do | 0.22 |
| C | do | 0.29 |
| D | do | 0.37 |
| E | Calcium Carbonate | 0.0066 |
| F | do | 0.0090 |

The reduction in corrosion of the metal plate in contact with a hydroformylation reaction product treated in a demetalling zone packed with calcium carbonate in accordance with our process is startling. Even when run A, the best run using Berl saddles as packing, is compared with run F, the least effective of the runs using calcium carbonate as packing, the corrosion rate is more than 23 times as great with an ordinary packing material such as Berl saddles as with calcium carbonate.

The neutralization number, saponification number and calcium content of the water and/or aldehyde product obtained in the above runs were determined and the data are set forth below in Table II.

Table II

| Run No. | Packing | Demetalled Product | Neut. No., Mg. KOH/gm. (ASTM D974-54T) | Sap. No., Mg. KOH/gm. (ASTM D94-52T) | Ca, Percent by Weight |
|---|---|---|---|---|---|
| A | Berl Saddles | Water Aldehyde | 1.55 / 1.84 / 1.74 | 18.0 |  |
| B | do | do | (*) | (*) |  |
| C | do | do | 1.93 / 2.01 | 27.9 |  |
| D | do | do | 1.86 / 1.84 | 22.4 |  |
| E | Calcium Carbonate | do | [1] 0.79 / [2] 2.13 / [3] 0.31 | [2] 18.7 | [2] 0.18 / [2] 0.00005 / [3] 0.33 |
| F | do | do | [1] 1.92 | [1] 24.6 | [4] 0.00032 |

*Not determined.
[1] Average of 4 runs.
[2] Average of 3 runs.
[3] Average of 2 runs.
[4] Average of 5 runs.

As can be seen from the data in Table II, while the saponification number of the aldehyde product was not seriously affected, the neutralization number of the water removed from the demetalling zone when calcium carbonate was employed was substantially lower than in the case when Berl saddles were used. Substantially all of the calcium removed from the demetalling zone is removed with the water and not with the aldehyde product. As a result of this, little or no calcium will enter the hydrogenation zone and adversely affect the activity of the catalyst therein, or will have to be removed from the final alcohol product.

In order to show that the process of this invention improves the activity of a hydrogenation catalyst, we have, exactly as defined above in Example I, carried out the hydroformylation reaction process, passed the hydroformylation reaction product through the demetalling zone, alternatively with Berl saddles and calcium carbonate packing as before, and thereafter passed the demetalled product along with distilled water (0.17 gram water per gram demetalled hydroformylation reaction product) through reactor 78 containing nickel as catalyst. The minimum temperature (at the inlet to reactor 78) varied during the run between 320° and 340° F., and the maximum temperature (at the outlet of reactor 78) varied between 397° and 402° F., the pressure was maintained at 1000 pounds per square inch, and the space velocity (volume of product per volume of catalyst per hour) was 3.6. Readings were begun at the end of 377 hours and continued through to 863 hours. Berl saddles were used as packing through 586 hours, and the nickel catalyst was regenerated at the end of 511 hours and 586 hours by heating the same at 950° F. for 16 hours and reducing at 700° F. for 18 hours. After 586 hours and through the remainder of the operation calcium carbonate chips whose average longest dimension was ½ inch were used as packing in place of Berl saddles. The results obtained are set forth below in Table III.

Table III

| Time on Catalyst, Hours | Temperature Rise Across Reactor, °F. | Product Obtained Aldehydes, Percent by Weight |
|---|---|---|
| 377 | 79 | 14.7 |
| 389 | 75 | 16.0 |
| 401 | 74 | 18.2 |
| 413 | 67 | 19.9 |
| 425 | 70 | 21.6 |
| 430 | 66 | 21.1 |
| 433 | 66 | 18.7 |
| 445 | 65 | 22.8 |
| 457 | 65 | 22.9 |
| 469 | 64 | 24.1 |
| 481 | 64 | 24.7 |
| 493 | 62 | 24.6 |
| 505 | 63 | 23.2 |
| 511 | 62 | (*) |
| 519 | 84 | 11.3 |
| 531 | 73 | 16.8 |
| 543 | 70 | 19.5 |
| 555 | 68 | 20.5 |
| 567 | 66 | 21.3 |
| 574 | 66 | (*) |
| 586 | 64 | 22.5 |
| 591 | 82 | 11.4 |
| 603 | 74 | 16.1 |
| 615 | 71 | 17.4 |
| 627 | 70 | 18.2 |
| 639 | 68 | 18.6 |
| 646 | 69 | (*) |
| 654 | 69 | 18.8 |
| 659 | 68 | 18.4 |
| 671 | 69 | 18.5 |
| 683 | 70 | 18.4 |
| 695 | 72 | 19.2 |
| 706 | 70 | 19.5 |
| 718 | 72 | 20.3 |
| 731 | 72 | 21.1 |
| 740 | 71 | 20.4 |
| 755 | 68 | 20.6 |
| 767 | 67 | 20.7 |
| 779 | 68 | 20.9 |
| 791 | 69 | 20.8 |
| 803 | 68 | 21.5 |
| 815 | 69 | 21.7 |
| 827 | 67 | 21.8 |
| 839 | 67 | 21.9 |
| 851 | 68 | 21.7 |
| 863 | 70 | 20.9 |

*Not taken.

As can be seen from the above Table III hydrogenation of the aldehydes to the corresponding alcohols falls off appreciably when Berl saddles are used as packing in the demetalling zone. Thus, while only 14.7 percent of aldehyde were present at the end of 377 hours, at the end of 505 hours the amount was increased to 23.2 percent by weight of aldehyde. When the hydrogenation catalyst was regenerated at the end of 511 hours, the amount of aldehyde was reduced to 11.3 percent. However, by the end of 586 hours, 22.5 percent of the aldehydes remained unconverted. When the hydrogenation catalyst was regenerated at the end of 586 hours and calcium carbonate was used as packing 11.4 percent of the aldehydes remained unconverted. By the end of 718 hours, the amount of aldehydes remaining unconverted was increased to 20.3 percent. However, after that and until the end of the run, for a period of 135 hours, the amount of aldehydes remaining unconverted remained stabilized at this figure, which was less than with Berl saddles.

Obviously, many modifications and variations of the invention, as hereinabove set forth, may be made without departing from the spirit and scope thereof, and therefore only such limitations should be imposed as are indicated in the appended claims.

We claim:
1. A method of producing aldehydes which comprises reacting an olefin with synthesis gas comprising hydrogen and carbon monoxide in the presence of a metallic hydroformylation reaction catalyst at an elevated pressure and elevated temperature to obtain a hydroformylation reaction product comprising an aldehyde having one more carbon than said olefin and at least one dissolved metal carbonyl, passing said hydroformylation reaction product to a demetalling zone containing calcium carbonate, passing steam to said demetalling zone to raise the temperature of the resulting mixture to a temperature sufficiently high to decompose said metal carbonyl and deposit the corresponding metal on said calcium carbonate, and thereafter separating the treated hydroformylation reaction product from water resulting from condensation of said steam.

2. A method of producing aldehydes which comprises reacting an olefin with synthesis gas comprising hydrogen and carbon monoxide in the presence of a cobalt catalyst at an elevated pressure and elevated temperature to obtain a hydroformylation reaction product comprising an aldehyde having one more carbon than said olefin and at least cobalt carbonyl, passing said hydroformylation reaction product to a demetalling zone containing calcium carbonate, passing steam to said demetalling zone to raise the temperature of the resulting mixture to a temperature sufficiently high to decompose at least said cobalt carbonyl and deposit cobalt on said calcium carbonate and thereafter separating the treated hydroformylation reaction product from water resulting from condensation of said steam.

3. A method of producing aldehydes which comprises reacting an olefin with synthesis gas comprising hydrogen and carbon monoxide in the presence of a cobalt catalyst at an elevated pressure and elevated temperature to obtain a hydroformylation reaction product comprising an aldehyde having one more carbon than said olefin and at least cobalt carbonyl, passing said hydroformylation reaction product to a demetalling zone containing calcium carbonate, passing steam to said demetalling zone to raise the temperature of the resulting mixture to at least about 165° F., and thereafter separating the treated hydroformylation reaction product from water resulting from condensation of said steam.

4. A method of producing aldehydes which comprises reacting an olefin with synthesis gas comprising hydrogen and carbon monoxide in the presence of a cobalt catalyst at an elevated pressure and elevated temperature to obtain a hydroformylation reaction product comprising an aldehyde having one more carbon than said olefin and at least cobalt carbonyl, passing said hydroformylation reaction product to a demetalling zone containing calcium carbonate, passing steam to said demetalling zone to raise the temperature of the resulting mixture to a temperature of about 165° to about 420° F., and thereafter separating the treated hydroformylation reaction product from water resulting from condensation of said steam.

5. A method of producing aldehydes which comprises reacting an olefin with synthesis gas comprising hydrogen and carbon monoxide in the presence of a cobalt catalyst at an elevated pressure and elevated temperature to obtain a hydroformylation reaction product comprising an aldehyde having one more carbon than said olefin and at least cobalt carbonyl, passing said hydroformylation reaction product to a demetalling zone containing calcium carbonate whose average longest dimension is at least about ¼ inch, passing steam to said demetalling zone to raise the temperature of the resulting mixture to a temperature sufficiently high to decompose at least said cobalt carbonyl and deposit cobalt on said calcium carbonate and thereafter separating the treated hydroformylation reaction product from water resulting from condensation of said steam.

6. A method of producing aldehydes which comprises reacting an olefin with synthesis gas comprising hydrogen and carbon monoxide in the presence of a metallic hydroformylation reaction catalyst at an elevated pressure and elevated temperature to obtain a hydroformylation reaction product comprising an aldehyde having one more carbon than said olefin and at least one dissolved metal carbonyl, passing said hydroformylation reaction product to a demetalling zone containing calcium carbonate, passing steam to said demetalling zone to raise the temperature of the resulting mixture to a temperature sufficiently high to decompose said metal carbonyl and deposit the corresponding metal on said calcium carbonate, and thereafter separating the treated hydroformylation reaction product from water resulting from condensation of said steam while maintaining a pressure substantially similar to that existing in said demetalling zone.

References Cited in the file of this patent

UNITED STATES PATENTS 2,638,485    Mertzweiller _____ May 12, 1953

FOREIGN PATENTS 660,737    Great Britain _____ Nov. 14, 1951